(12) United States Patent
Shigeta et al.

(10) Patent No.: US 10,950,868 B2
(45) Date of Patent: Mar. 16, 2021

(54) GAS DIFFUSION ELECTRODE AND FUEL CELL

(71) Applicant: TORAY INDUSTRIES, INC., Tokyo (JP)

(72) Inventors: Kazuyo Shigeta, Otsu (JP); Masamichi Utsunomiya, Otsu (JP); Yasutaka Okano, Otsu (JP); Yasuaki Tanimura, Otsu (JP); Toshiya Kamae, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/777,447

(22) PCT Filed: Dec. 16, 2016

(86) PCT No.: PCT/JP2016/087626
§ 371 (c)(1),
(2) Date: May 18, 2018

(87) PCT Pub. No.: WO2017/110692
PCT Pub. Date: Jun. 29, 2017

(65) Prior Publication Data
US 2018/0375105 A1  Dec. 27, 2018

(30) Foreign Application Priority Data

Dec. 24, 2015 (JP) .............................. JP2015-251252

(51) Int. Cl.
*H01M 4/86* (2006.01)
*H01M 4/96* (2006.01)
(Continued)

(52) U.S. Cl.
CPC ........... *H01M 4/8605* (2013.01); *H01M 4/86* (2013.01); *H01M 4/8807* (2013.01); *H01M 4/96* (2013.01);
(Continued)

(58) Field of Classification Search
CPC .... H01M 4/0605; H01M 4/86; H01M 4/8807; H01M 4/96; H01M 8/0234;
(Continued)

(56) References Cited

U.S. PATENT DOCUMENTS 6,127,059 A   10/2000  Kato
7,150,934 B2  12/2006  Yoshida et al.
(Continued)

FOREIGN PATENT DOCUMENTS

CN   102341943 A    2/2012
JP   2000123842 A   4/2000
(Continued)

OTHER PUBLICATIONS

English translation of JP-2004281363-A (Year: 2004).*
(Continued)

*Primary Examiner* — Christopher P Domone
*Assistant Examiner* — Kimberly Wyluda
(74) *Attorney, Agent, or Firm* — RatnerPrestia

(57) ABSTRACT

A gas diffusion electrode in which a microporous layer is provided on at least one surface of a conductive porous substrate, wherein the areas obtained by dividing the cross section perpendicular to the plane of the microporous layer into three equal parts in the thickness direction are a first area, a second area, and a third area, with respect to the conductive porous substrate side, the fluorine strength of the third area being 0.8 to 1.2 times the fluorine strength of the second area.

8 Claims, 1 Drawing Sheet

(51) Int. Cl.
*H01M 8/0234* (2016.01)
*H01M 8/0245* (2016.01)
*H01M 8/04119* (2016.01)
*H01M 4/88* (2006.01)
*H01M 8/10* (2016.01)

(52) U.S. Cl.
CPC ....... *H01M 8/0234* (2013.01); *H01M 8/0245* (2013.01); *H01M 8/04119* (2013.01); *H01M 8/10* (2013.01)

(58) Field of Classification Search
CPC .. H01M 8/0245; H01M 8/04119; H01M 8/10; H01M 4/8605
See application file for complete search history.

(56) References Cited

U.S. PATENT DOCUMENTS

| | | | |
|---|---|---|---|
| 7,749,639 | B2 | 7/2010 | Ichikawa et al. |
| 8,641,939 | B2 | 2/2014 | Chida et al. |
| 9,570,758 | B2 | 2/2017 | Gomi et al. |
| 2006/0046926 | A1* | 3/2006 | Ji ................ H01M 4/8605 502/101 |
| 2007/0224479 | A1 | 9/2007 | Tadokoro et al. |
| 2011/0171563 | A1 | 7/2011 | Waki et al. |
| 2011/0318661 | A1 | 12/2011 | Uensal et al. |
| 2014/0011118 | A1 | 1/2014 | Lee et al. |
| 2014/0134516 | A1 | 5/2014 | Okuyama et al. |
| 2015/0372332 | A1 | 12/2015 | Okano et al. |
| 2017/0237079 | A1 | 8/2017 | Tanimura et al. |

FOREIGN PATENT DOCUMENTS

| | | | |
|---|---|---|---|
| JP | 2000182626 | A | 6/2000 |
| JP | 2001160399 | A | 6/2001 |
| JP | 2002352807 | A | 12/2002 |
| JP | 3382213 | B2 | 3/2003 |
| JP | 2004281363 | A * | 10/2004 |
| JP | 2004281363 | A | 10/2004 |
| JP | 2006155921 | A | 6/2006 |
| JP | 2007214019 | A | 8/2007 |
| JP | 3773325 | B2 | 2/2008 |
| JP | 2008300195 | A | 12/2008 |
| JP | 2009016171 | A * | 1/2009 |
| JP | 2009238376 | A | 10/2009 |
| JP | 2010070433 | A | 4/2010 |
| JP | 2010267539 | A | 11/2010 |
| JP | 4780814 | B2 | 9/2011 |
| JP | 2011233274 | A | 11/2011 |
| JP | 2011243314 | A | 12/2011 |
| JP | 2012033458 | A | 2/2012 |
| JP | 2012054111 | A | 3/2012 |
| JP | 2012204142 | A | 10/2012 |
| JP | 2013065413 | A | 4/2013 |
| JP | 2013065413 | A | 4/2013 |
| JP | 2014011163 | A | 1/2014 |
| JP | 2014232691 | A | 12/2014 |
| JP | 2014232691 | A | 12/2014 |
| JP | 2015195111 | A | 11/2015 |
| WO | 03081700 | A1 | 10/2003 |
| WO | 2007037084 | A1 | 4/2007 |
| WO | 2010035815 | A1 | 4/2010 |
| WO | 2012172994 | A1 | 12/2012 |
| WO | 2014126002 | A1 | 8/2014 |
| WO | 2016060043 | A1 | 4/2016 |

OTHER PUBLICATIONS

English translation of JP-2009016171-A (Year: 2009).*
International Search Report and Written Opinion for International Application No. PCT/JP2016/087626, dated Mar. 7, 2017, 9 pages.
International Search Report and Written Opinion for International Application No. PCT/JP2016/087624, dated Feb. 14, 2017, 6 pages.
International Search Report and Written Opinion for International Application No. PCT/JP2016/087625, dated Mar. 14, 2017, 6 pages.
Non Final Office Action for U.S. Appl. No. 16/064,234, dated Mar. 27, 2020, 10 pages.
Non Final Office Action for U.S. Appl. No. 16/064,237, dated Mar. 6, 2020, 13 pages.

* cited by examiner

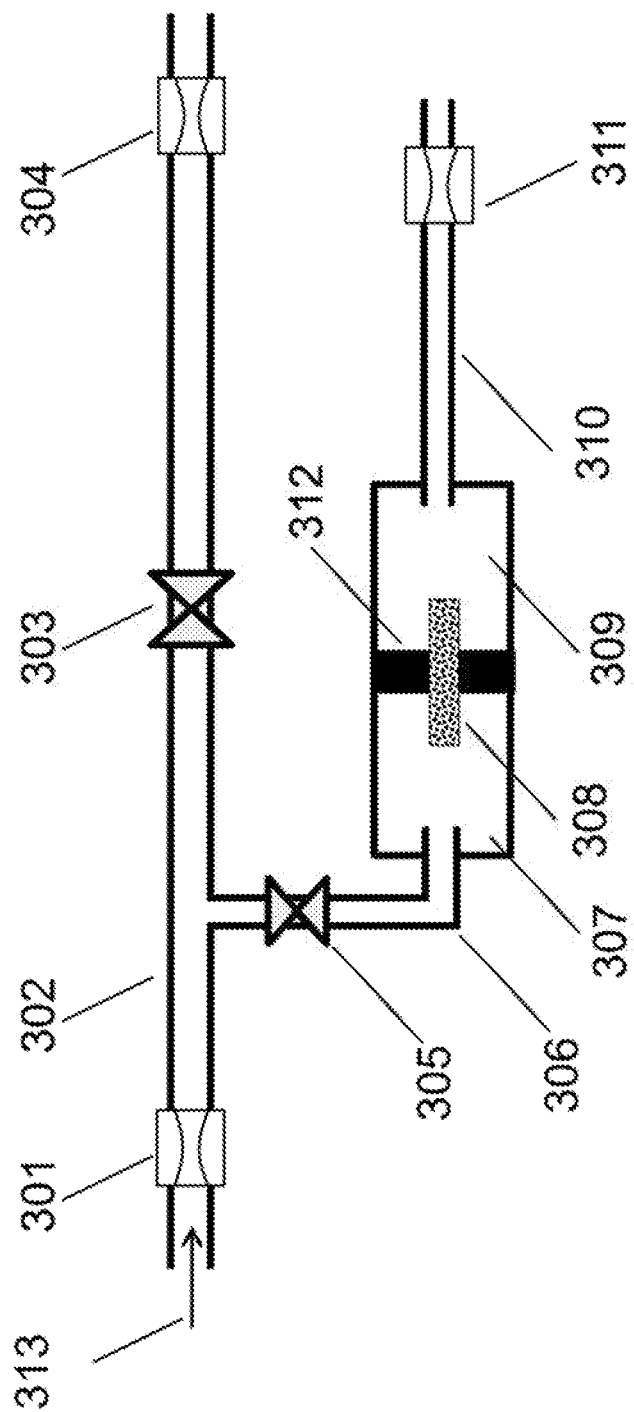

GAS DIFFUSION ELECTRODE AND FUEL CELL

CROSS REFERENCE TO RELATED APPLICATIONS

This is the U.S. National Phase application of PCT/JP2016/087626, filed Dec. 16, 2016, which claims priority to Japanese Patent Application No. 2015-251252, filed Dec. 24, 2015, the disclosure of these applications being incorporated herein by reference in their entireties for all purposes.

TECHNICAL FIELD OF THE INVENTION

The present invention relates to a gas diffusion electrode and a fuel cell.

BACKGROUND OF THE INVENTION

A fuel cell is a system in which energy generated in production of water by reaction of hydrogen and oxygen is electrically extracted. Fuel cells are expected to come into wide use as clean energy sources because they have high energy efficiency, and discharge only water. Among them, polymer electrolyte fuel cells are known as fuel cells to be used as power sources for fuel cell vehicles etc.

An electrode to be used for a polymer electrolyte fuel cell is disposed so as to be sandwiched between two bipolar plates in the polymer electrolyte fuel cell. Such an electrode has a structure in which on both sides of a polymer electrolyte membrane, a catalyst layer is formed on the surface of the polymer electrolyte membrane, and a gas diffusion layer is formed outside the catalyst layer. As an individual member for forming a gas diffusion layer in an electrode, a gas diffusion electrode is distributed. The gas diffusion electrode is required to have performance such as, for example, gas diffusivity, electrical conductivity for collecting electricity generated in the catalyst layer, and water removal performance for efficiently removing water generated on the surface of the catalyst layer. For obtaining such a gas diffusion electrode, an electrically conductive porous substrate having both gas diffusion performance and electrical conductivity is generally used.

Specific examples of the electrically conductive porous substrate that is used include carbon felts, carbon papers and carbon cloths. Among them, carbon papers are most preferable from the viewpoint of mechanical strength etc.

In addition, a fuel cell is a system in which energy generated in production of water by reaction of hydrogen and oxygen is electrically extracted. Thus, when an electrical load increases, i.e. a current to be extracted outside the cell increases, a large amount of water (water vapor) is generated. At a low temperature, the water vapor is condensed into water droplets, so that pores of the gas diffusion electrode are closed, and the amount of a gas (oxygen or hydrogen) supplied to the catalyst layer decreases. When all the pores are ultimately closed, power generation is stopped (this phenomenon is referred to as flooding).

The gas diffusion electrode is required to have water removal performance so that occurrence of the flooding is inhibited as much as possible. As means for improving the water removal performance, a gas diffusion electrode substrate with an electrically conductive porous substrate subjected to a hydrophobic treatment is normally used.

When an electrically conductive porous substrate subjected to a hydrophobic treatment as described above is used directly as a gas diffusion electrode, condensation of water vapor leads to generation of large water droplets because the substrate has a coarse fiber, and thus flooding easily occurs. Thus, a coating material in which electrically conductive fine particles of carbon black etc. are dispersed may be applied, dried and sintered to provide a layer called a microporous layer on an electrically conductive porous substrate subjected to a hydrophobic treatment. It is known that a fluororesin is added as a hydrophobic resin in the microporous layer for imparting hydrophobicity to the microporous layer (Patent Documents 1 and 2). As a role of the microporous layer, mention is made of, in addition to that described above, an effect of preventing penetration of the catalyst layer into a coarse gas diffusion electrode substrate (Patent Document 3). As another role of the microporous layer, mention is made of a makeup effect for preventing transfer of coarseness of the electrically conductive porous substrate to the electrolyte membrane.

On the other hand, for fuel cells for fuel cell vehicles and the like, power generation performance under operation conditions at high temperature is also required. At high temperature, the electrolyte membrane is easily dried, and therefore the ion conductivity of the electrolyte membrane is reduced, leading to deterioration of power generation performance (this phenomenon is referred to as dry-out).

PATENT DOCUMENTS

Patent Document 1: Japanese Patent Publication No. 3382213
Patent Document 2: Japanese Patent Laid-open Publication No. 2006-4879
Patent Document 3: Japanese Patent Publication No. 3773325

SUMMARY OF THE INVENTION

However, in the technique disclosed in the Patent Document 1 or 3, the intensity of fluorine in the microporous layer gradually is increased toward the electrically conductive porous substrate from the surface. Thus, hydrophobicity at the surface of the microporous layer is insufficient, so that water produced in the catalyst layer is retained on the surface. As a result, gas diffusivity is reduced, leading to deterioration of power generation performance.

In the technique disclosed in the Patent Document 2, the surface of the microporous layer has an excessively high fluorine intensity, and hence excessively high hydrophobicity. Thus, the water removal performance of the microporous layer is reduced, leading to deterioration of power generation performance.

Thus, it is difficult to attain both flooding resistance and dry-out resistance. In addition, in applications that require high power, such as those in which a fuel cell is mounted on a fuel cell vehicle, it is difficult to obtain high performance in a wide temperature range.

An object of the present invention is to provide a gas diffusion electrode having both dry-out resistance and flooding resistance and having excellent power generation performance as a fuel cell by overcoming the above-mentioned defects of conventional techniques.

The present invention employs the following means for solving the above-mentioned problems.

(1) Provided is a gas diffusion electrode including a microporous layer on at least one surface of an electrically conductive porous substrate, wherein provided that regions obtained by dividing a cross-section perpendicular to the surface of the microporous layer into three equal parts in a thickness direction are a first region, a second region and a third region from a side of the electrically conductive porous substrate, the fluorine intensity of the third region is 0.8 to 1.2 times the fluorine intensity of the second region.

(2) Also provided is a gas diffusion electrode including a microporous layer on at least one surface of an electrically conductive porous substrate, wherein provided that regions obtained by dividing a cross-section perpendicular to the surface of the microporous layer into three equal parts in a thickness direction are a first region, a second region and a third region from a side of the electrically conductive porous substrate, the fluorine intensity of the third region is 0.8 to 1.2 times the fluorine intensity of the first region.

Hereinafter, the invention described in (1) is referred to as a first aspect of the present invention, and the invention described in (2) is referred to as a second aspect of the present invention. The first aspect and the second aspect together are referred to simply as the present invention.

A gas diffusion electrode of the present invention has high gas diffusivity and excellent water removal performance, so that both flooding resistance and dry-out resistance can be attained, and therefore by using the gas diffusion electrode of the present invention, there can be provided a fuel cell having both dry-out resistance and flooding resistance and having high power generation performance in a wide temperature range.

BRIEF DESCRIPTION OF THE DRAWINGS

The FIGURE is a schematic view of an apparatus for measuring gas diffusivity in an in-plane direction.

DETAILED DESCRIPTION OF EMBODIMENTS OF THE INVENTION

According to a first aspect of the present invention, a gas diffusion electrode includes a microporous layer on at least one surface of an electrically conductive porous substrate, wherein provided that regions obtained by dividing a cross-section perpendicular to the surface of the microporous layer into three equal parts in a thickness direction are a first region, a second region and a third region from a side of the electrically conductive porous substrate, the fluorine intensity of the third region is 0.8 to 1.2 times the fluorine intensity of the second region.

According to a second aspect of the present invention, a gas diffusion electrode includes a microporous layer on at least one surface of an electrically conductive porous substrate, wherein provided that regions obtained by dividing a cross-section perpendicular to the surface of the microporous layer into three equal parts in a thickness direction are a first region, a second region and a third region from a side of the electrically conductive porous substrate, the fluorine intensity of the third region is 0.8 to 1.2 times the fluorine intensity of the first region.

That is, the gas diffusion electrode of the present invention includes a microporous layer on at least one surface of an electrically conductive porous substrate. Provided that regions obtained by dividing a cross-section perpendicular to the surface of the microporous layer into three equal parts in a thickness direction are a first region, a second region and a third region from a side of the electrically conductive porous substrate, the fluorine intensity of the third region is 0.8 to 1.2 times the fluorine intensity of the second region. Otherwise, the fluorine intensity of the third region is 0.8 to 1.2 times the fluorine intensity of the first region.

First, the electrically conductive porous substrate will be described with regard to the gas diffusion electrode of the present invention.

Specific examples of the electrically conductive porous substrate that is preferably used include porous substrates containing a carbon fiber, such as carbon fiber fabrics, carbon fiber papermaking materials, carbon fiber nonwoven fabrics, carbon felts, carbon papers and carbon cloths, and metal porous substrates such as foamed sintered metals, metal meshes and expanded metals. Among them, porous substrates containing carbon fiber, such as carbon felts, carbon papers and carbon cloths, are preferably used because they are excellent in corrosion resistance. Further, a substrate obtained by binding a carbon fiber papermaking material with a carbide, i.e. a carbon paper is preferably used because it is excellent in property of absorbing a change in dimension of an electrolyte membrane in a thickness direction, i.e. "spring property".

In the present invention, it is preferable that the thickness of the electrically conductive porous substrate such as a carbon paper is reduced from the viewpoint of improving gas diffusivity. Specifically, the thickness of the electrically conductive porous substrate such as a carbon paper is preferably 220 μm or less, more preferably 150 μm or less, especially preferably 120 μm or less. On the other hand, when the electrically conductive porous substrate is excessively thin, the mechanical strength is reduced, so that handling in the production process is difficult, and therefore the lower limit of the thickness of the electrically conductive porous substrate is normally 70 μm.

In the present invention, an electrically conductive porous substrate subjected to a hydrophobic treatment by adding a fluororesin thereto is suitably used. Preferably, the electrically conductive porous substrate for use in the present invention contains a hydrophobic resin such as a fluororesin because the fluororesin acts as a hydrophobic resin. Examples of the hydrophobic resin contained in the electrically conductive porous substrate, i.e. the fluororesin contained in the electrically conductive porous substrate include PTFE (polytetrafluoroethylene) (e.g. "Teflon" (registered trademark)), FEP (ethylene tetrafluoride-propylene hexafluoride copolymer), PFA (perfluoroalkoxy fluororesin), ETFA (ethylene-ethylene tetrafluoride copolymer), PVDF (polyvinylidene fluoride) and PVF (polyvinyl fluoride). Among them, PTFE or FEP, which exhibits high hydrophobicity, is preferable.

The amount of the hydrophobic resin is not particularly limited, and the suitable amount of the hydrophobic resin is about 0.1% by mass or more and 20% by mass or less based on 100% by mass of the total of the electrically conductive porous substrate. When the amount of the hydrophobic resin is 0.1% by mass or more, sufficient hydrophobicity is easily exhibited. When the amount of the hydrophobic resin is 20% by mass or less, pores that form a gas diffusion path or a drainage path are hardly closed, and electric resistance is hardly increased.

As a method for subjecting the electrically conductive porous substrate to a hydrophobic treatment, a commonly known treatment technique is applicable in which the electrically conductive porous substrate is immersed in a dispersion containing a hydrophobic resin. In addition, a coating technique is applicable in which a hydrophobic resin is applied to the electrically conductive porous substrate by die coating, spray coating or the like. In addition, processing using a dry process such as sputtering of a fluororesin can also be applied. If necessary, a drying process, and a sintering process may be added after the hydrophobic treatment.

The microporous layer will now be described.

The microporous layer is a layer containing electrically conductive fine particles of carbon black, carbon nanotube, carbon nanofiber, chopped carbon fiber, graphene, graphite or the like. For electrically conductive fine particles, carbon black is suitably used from the viewpoint of a low cost, safety, and product quality and stability. Among them, acetylene black is suitably used because the content of impurities is low, so that the activity of a catalyst is hardly reduced.

As an index of the content of impurities in carbon black, mention is made of an ash content. In the present invention, it is preferable that carbon black having an ash content of 0.1% by mass or less is used in the microporous layer. The ash content of carbon black is preferably as small as possible, and carbon black having an ash content of 0% by mass, i.e. carbon black which does not contain ash, is especially preferable.

The microporous layer is required to have properties such as electrical conductivity, gas diffusivity, water removal performance, moisture retentivity and thermal conductivity, and strong acid resistance on the anode side and oxidation resistance on the cathode side in a fuel cell. Thus, it is preferable that the microporous layer contains a hydrophobic resin such as a fluororesin in addition to electrically conductive fine particles. Examples of the fluororesin contained in the microporous layer include PTFE, FEP, PFA and ETFA as in the case of a fluororesin that is suitably used at the time when the electrically conductive porous substrate is made hydrophobic. The fluororesin is preferably PTFE or FEP because it has particularly high hydrophobicity.

In the present invention, the fluorine intensity of each region in the microporous layer is controlled to a specific value, and the method for measuring the fluorine intensity is as follows. That is, for measuring the fluorine intensity in the microporous layer, a cross-section perpendicular to the surface in a thickness direction is cut out by an ion milling apparatus (Model IM4000 manufactured by Hitachi High-Tech Solutions Corporation or its equivalent apparatus can be used), and observed with a scanning electron microscope (SEM), and the microporous layer is divided into three parts in the thickness direction. The fluorine intensity and the carbon intensity are measured by element distribution analysis. In element distribution analysis, for example, an electron beam is applied, and a reflected characteristic X-ray is detected by an energy dispersive X-ray analyzer (EDX) or an electron probe microanalyzer (EPMA), and quantified to determine the fluorine intensity and the carbon intensity. The ratio of the fluorine intensity to the carbon intensity (fluorine intensity/carbon intensity) is calculated by dividing the fluorine intensity, which is obtained by quantification, by the carbon intensity. Each of the fluorine intensity and the carbon intensity is an average of values detected by making the measurement at fixed intervals in the thickness direction in each region, and details thereof will be described below.

In the present invention, provided that regions obtained by dividing a cross-section perpendicular to the surface of the microporous layer into three equal parts in a thickness direction are a first region, a second region and a third region from a side of the electrically conductive porous substrate, the fluorine intensity of the third region is 0.8 to 1.2 times the fluorine intensity of the second region, or 0.8 to 1.2 times the fluorine intensity of the first region. When the fluorine intensity of the third region is equal to or less than 1.2 times the fluorine intensity of the second region or the first region, the hydrophobicity of the microporous layer is not excessively high, and water (water vapor) produced in the catalyst layer can be removed from the gas diffusion electrode in the cathode, leading to improvement of power generation performance. On the other hand, when the fluorine intensity of the third region is equal to or more than 0.8 times the fluorine intensity of the second region or the first region, the surface of the microporous layer has sufficient hydrophobicity, water (water vapor) produced in the catalyst layer is not retained on the surface in the cathode, reversely diffused water does not permeate in the anode, and thus gas diffusivity is improved, leading to improvement of power generation performance.

In the gas diffusion electrode of the present invention, the fluorine intensity of the third region is preferably 0.8 to 1.0 time the fluorine intensity of the second region. In the gas diffusion electrode of the present invention, the fluorine intensity of the third region is more preferably 0.8 to 0.98 time the fluorine intensity of the second region. When the fluorine intensity of the third region is 0.8 to 1.0 time, more preferably 0.8 to 0.98 time the fluorine intensity of the second region, a gas diffusion electrode which is well-balanced between water removal performance and gas diffusivity and which does not suffer drying (dry-out) of an electrolyte membrane can be obtained.

In the gas diffusion electrode of the present invention, the fluorine intensity of the third region is preferably 0.8 to 1.0 time the fluorine intensity of the first region. The fluorine intensity of the third region is more preferably 0.8 to 0.98 time the fluorine intensity of the first region. When the fluorine intensity of the third region is 0.8 to 1.0 time the fluorine intensity of the first region, a gas diffusion electrode which is well-balanced between water removal performance and gas diffusivity and which does not suffer drying (dry-out) of an electrolyte membrane can be obtained.

In the gas diffusion electrode of the present invention, it is particularly preferable that the fluorine intensity of the third region is 0.8 to 1.0 time the fluorine intensity of the second region, and 0.8 to 1.0 time the fluorine intensity of the first region. Still more preferably, the fluorine intensity of the third region is 0.8 to 0.98 time the fluorine intensity of the second region, and 0.8 to 0.98 time the fluorine intensity of the first region.

In the gas diffusion electrode of the present invention, the fluorine intensity/carbon intensity ratio of the third region is preferably 1.0 to 1.3 times the fluorine intensity/carbon intensity ratio of the second region where the fluorine intensity/carbon intensity ratio is a ratio of the fluorine intensity to the carbon intensity (fluorine intensity/carbon intensity). In the gas diffusion electrode of the present invention, the fluorine intensity/carbon intensity ratio of the third region is preferably 1.0 to 1.3 times the fluorine intensity/carbon intensity ratio of the first region where the fluorine intensity/carbon intensity ratio is a ratio of the fluorine intensity to the carbon intensity (fluorine intensity/carbon intensity). When the fluorine intensity/carbon intensity ratio of the third region is equal to or more than 1.0 time the fluorine intensity/carbon intensity ratio of the second region or the first region, the microporous layer has sufficient hydrophobicity, so that gas diffusivity may be improved, leading to improvement of power generation performance. When the fluorine intensity/carbon intensity ratio of the third region is equal to or less than 1.3 times the fluorine intensity/carbon intensity ratio of the second region or the first region, the hydrophobicity of the microporous layer is not excessively high, and therefore water (water vapor) produced in the catalyst layer may be easily removed from the gas diffusion electrode in the cathode, leading to improvement of power generation performance.

In the gas diffusion electrode of the present invention, the contact angle of the microporous layer to water is preferably 115 degrees or more. The contact angle is more preferably 135 degrees or more.

In the gas diffusion electrode of the present invention, the microporous layer may include two or more layers. When the microporous layer includes a plurality of layers, it is preferable that among the two or more layers, the layer on the surface side contains at least the hydrophobic resin, and further contains the electrically conductive fine particles. When the layer on the surface side contains only the hydrophobic resin, hydrophobicity is excessively high, and therefore it is preferable that the layer on the surface side contains not only the hydrophobic resin but also the electrically conductive fine particles.

Here, the microporous layer may include a plurality of layers, e.g. a first microporous layer, a second microporous layer and so on, according to the number of times of applying the microporous layer coating material. That is, when the microporous layer has a two-layer structure, the number of times of applying the microporous layer coating material is 2. When the microporous layer includes a plurality of layers, the regions obtained by dividing the microporous layer into three equal parts in a thickness direction, in the present invention, are such that all of the plurality of layers are considered as a microporous layer, and this microporous layer is divided into three equal parts to obtain a first region, a second region and a third region. In the present invention, for ensuring that the fluorine intensity of the third region is 0.8 to 1.2 times the fluorine intensity of the second region, or 0.8 to 1.2 times the fluorine intensity of the first region, for example, a method is preferable in which the microporous layer is made to have a two-layer structure, and the content of a fluororesin in the second microporous layer coating material is made smaller than the content of a fluororesin in the first microporous layer coating material. This is because it is easy to control the fluororesin intensity in each region.

For the gas diffusion electrode to have a microporous layer, a coating material for forming a microporous layer, i.e. a microporous layer forming material (hereinafter, referred to as a microporous layer coating material), is generally applied to the electrically conductive porous substrate. The microporous layer coating material normally contains the electrically conductive fine particles, and a dispersion medium such as water or alcohol, and a surfactant or the like is often blended as a dispersant for dispersing electrically conductive fine particles. When the hydrophobic resin is included in the microporous layer, it is preferable to include the hydrophobic resin in the microporous layer coating material beforehand.

As a method for forming a microporous layer on the electrically conductive porous substrate, a method is also known in which the microporous layer coating material is applied onto a substrate such as a PET film, the microporous layer surface thereof is press-bonded onto the electrically conductive porous substrate, and the substrate film is peeled off. However, in the above transferring method, the production process is complicated, and it may be unable to obtain sufficient adhesion between the electrically conductive porous substrate and the microporous layer. Thus, as a method for forming a microporous layer, a method in which the microporous layer coating material is applied to the electrically conductive porous substrate is preferable.

The concentration of electrically conductive fine particles in the microporous layer coating material is preferably 5% by mass or more, more preferably 10% by mass or more from the viewpoint of productivity. There is not an upper limit on the concentration as long as the viscosity, the dispersion stability of electrically conductive particles, the coating ability of the coating material, and the like are suitable, but practically, when the concentration of electrically conductive fine particles in the microporous layer coating material is more than 50% by mass, suitability as a coating material may be impaired.

As a role of the microporous layer, mention is made of, for example, (1) protection of a catalyst, (2) a makeup effect in which a surface of a course electrically conductive porous substrate is prevented from being transferred to the electrolyte membrane, and (3) an effect of preventing condensation of water vapor generated in a cathode. For exhibiting the makeup effect among the above-mentioned effects, it is preferable that the microporous layer has a certain thickness.

In the present invention, the thickness of the microporous layer is preferably more than 10 μm and 60 μm or less as a dry thickness when considering the coarseness of the electrically conductive porous substrate. When the thickness of the microporous layer is more than 10 μm, the makeup effect is easily exhibited sufficiently, and when the thickness of the microporous layer is 60 μm or less, the gas diffusivity (permeability) of the gas diffusion electrode is easily improved, and electric resistance is easily reduced. From the viewpoint of improving gas diffusivity or reducing electric resistance, the thickness of the microporous layer is preferably 50 μm or less, more preferably 40 μm or less.

The thickness of the gas diffusion electrode or the electrically conductive porous substrate can be measured using a micrometer etc. while a load of 0.15 MPa is applied to the substrate. Another measurement method is a method in which the gas diffusion electrode is cut in a thickness direction using an ion milling apparatus such as IM4000 manufactured by Hitachi High-Tech Solutions Corporation, the resulting cross-section perpendicular to the surface (cross-section in the thickness direction) is observed with a scanning electron microscope (SEM), and the thickness is calculated from an image of the observed cross-section. In addition, the thickness of the microporous layer can be determined by subtracting the thickness of the electrically conductive porous substrate from the thickness of the gas diffusion electrode. Further, when the microporous layer has a two-layer structure, and the microporous layer on the surface side and the microporous layer on the electrically conductive porous substrate side are the second microporous layer and the first microporous layer, respectively, a level difference between a portion coated with the second microporous layer and a portion which is not coated with the second microporous layer in application of the second microporous layer on the electrically conductive porous substrate coated with the first microporous layer can be defined as the thickness of the second microporous layer.

The microporous layer coating material can be prepared by dispersing electrically conductive fine particles with a dispersant used as a surfactant as described above. For dispersing electrically conductive fine particles, it is preferable to disperse electrically conductive fine particles using the dispersant in an amount of 0.1% by mass or more and 5% by mass or less where the total content of the electrically conductive fine particles and the dispersant is 100% by mass. However, it is effective to increase the addition amount of dispersant for stabilizing the dispersion for a long time to prevent an increase in coating material viscosity, so that the material is not separated.

It is effective to add a thickener for keeping the microporous layer coating material at high viscosity as described above. The thickener to be used here may be one that is generally well known. For example, a methyl cellulose-based thickener, a polyethylene glycol-based thickener, a polyvinyl alcohol-based thickener or the like is suitably used.

For the dispersant and thickener, one substance may have two functions, or a material suitable for the function of each of the dispersant and the thickener may be selected. However, when the thickener and the dispersant are separately selected, it is preferable to select one that does not damage a dispersion system for electrically conductive fine particles and a dispersion system for the fluororesin as a hydrophobic resin. Here, the dispersant and thickener are collectively referred to as a surfactant. In the present invention, the total amount of the surfactant is preferably 50 parts by mass or more, more preferably 100 parts by mass or more, still more preferably 200 parts by mass or more based on the mass of electrically conductive fine particles added. The upper limit of the addition amount of the surfactant is normally 500 parts by mass or less based on the mass of electrically conductive fine particles added. When the above-mentioned addition amount is 500 parts by mass or less, a large amount of vapor and decomposed gas are hardly generated in a subsequent sintering step, so that safety and productivity are easily improved.

The microporous layer coating material can be applied to the electrically conductive porous substrate using a variety of commercially available coating apparatuses. As a coating system, screen printing, rotary screen printing, spraying, intaglio printing, gravure printing, coating with a die coater, bar coating, blade coating, coating with a knife coater or the like can be employed. Among these coating systems, coating with a die coater is preferable because the coating amount can be quantified irrespective of the surface roughness of the electrically conductive porous substrate. In addition, in the case where the smoothness of the coating surface is required for improving adhesion to the catalyst layer when the gas diffusion electrode is incorporated in the fuel cell, coating with a blade coater or a knife coater is suitably employed. The coating methods shown above are illustrative only, and the present invention is not necessarily limited thereto.

After the microporous layer coating material is applied, the dispersion medium (water in the case of an aqueous system) of the microporous layer coating material is removed by drying if necessary. When the dispersion medium is water, the drying temperature after coating is preferably from room temperature (around 20° C.) to 150° C. (inclusive), more preferably 60° C. or higher and 120° C. or lower. Drying of the dispersion medium (e.g. water) may be performed at a time in a subsequent sintering process.

After the microporous layer coating material is applied, sintering is generally performed for the purpose of removing a surfactant used in the microporous layer coating material, and binding electrically conductive fine particles by dissolving the hydrophobic resin once.

Depending on the boiling point or decomposition temperature of a surfactant added, the sintering temperature is preferably 250° C. or higher and 400° C. or lower. When the sintering temperature is 250° C. or higher, the surfactant is sufficiently removed, or easily removed completely in a short time. When the sintering temperature is 400° C. or lower, the hydrophobic resin is hardly decomposed.

From the viewpoint of productivity, the sintering time is preferably as short as possible, preferably 20 minutes or less, more preferably 10 minutes or less, still more preferably 5 minutes or less. On the other hand, when the sintering time is excessively short, vapor and decomposition products of the surfactant may be rapidly generated, and there may arise the risk of catching fire when sintering is performed in the air.

In the gas diffusion electrode of the present invention, it is preferable that carbon black contained in the first region of the microporous layer forms an aggregate (a so called structure), and the carbon black has a two-dimensionally or three-dimensionally linked structure. For this purpose, it is preferable that the carbon black in the first region has a structure index of 3.0 or more.

Here, the structure index is one obtained by dividing the value of a DBP oil absorption (cc/100 g) by the value of a BET specific surface area ($m^2$/g) of carbon black. When the value of the structure index increases, the branched structure of aggregation of carbon black is expanded, so that large holes are easily formed in the coated micro porous layer. However, when the structure index is excessively large, cracks are generated between aggregates of carbon black, and therefore the upper limit of the structure index of carbon black in the first region is preferably about 4.5.

In the third region of the microporous layer, the dispersion degree of electrically conductive fine particles to be blended in the second microporous layer coating liquid can be set high to form a dense coating layer, or electrically conductive fine particles having a small particle diameter can be used to form a dense layer having a low porosity. When carbon black is used as electrically conductive fine particles, the particles cannot be dispersed to a primary particle diameter, and therefore the pore diameter of the coating layer decreases depending on how the secondary particle diameter (diameter of particles aggregated to a certain degree) can be decreased in dispersion of the particles. In addition, it is preferable that carbon black having a structure index of less than 3.0 is used as carbon black in the third region. The structure index of the carbon black in the third region is more preferably 2.7 or less, but when the structure index is excessively small, the electrical conductivity of the carbon black is reduced, or the viscosity is excessively decreased when the carbon black is formed into a coating, and therefore it is preferable that the carbon black in the third region has a structure index of 1.5 or more.

In the gas diffusion electrode of the present invention, it is preferable that the microporous layer contains carbon black, the carbon black in the third region has a structure index of less than 3.0, and the carbon black in the first region has a structure index of 3.0 or more. When the structure indices of the carbon blacks in the third and first regions are in the above-mentioned ranges, respectively, a dense coating layer can be formed in the third region of the microporous layer, so that cracks are hardly generated on the surface, and voids are easily generated in the first region, so that passage of a gas and water is facilitated, thus making it possible to easily improve power generation performance. That is, both of suppression of crack generation on the surface of the gas diffusion electrode and improvement of power generation performance are easily attained.

The gas diffusion electrode of the present invention has excellent power generation performance at high temperature, and for improving power generation performance at low temperature of 40° C. or lower as well, the gas diffusivity in the thickness direction is preferably 30% or more, more preferably 32% or more. The gas diffusivity in the thickness direction is preferably as high as possible, but for preventing a situation in which in incorporation of the gas diffusion electrode in a fuel cell, the pore volume is so large that the structure thereof cannot be maintained when a pressure is applied to the inside of the cell, the upper limit of gas diffusivity in the thickness direction may be about 40%.

Similarly, for improving power generation performance at low temperature of 40° C. or lower as well, the gas diffusivity of the gas diffusion electrode of the present invention in the in-plane direction is preferably 25 cc/minute or more, more preferably 50 cc/minute or more. As described below, the gas diffusivity in the in-plane direction is measured at a pressure difference of 5 kPa as a basic measurement condition using the gas diffusion electrode. However, it is not possible to measure the gas diffusivity above 190 cc/minute as a limit in measurement. The practical upper limit value is about 190 cc/minute at a pressure difference of 3 kPa, and if the permeability exceeds this value, the thickness of the gas diffusion electrode is so large that the gas diffusivity in the thickness direction is reduced, or the porosity is so high that when the gas diffusion electrode is incorporated as a gas diffusion layer in a fuel cell, it is not possible to maintain the structure thereof as a gas diffusion layer.

A production apparatus suitable for producing the gas diffusion electrode of the present invention includes: an unwinding machine for unwinding a long electrically conductive porous substrate wound in a roll form; a first coating machine for applying a first microporous layer coating liquid to the electrically conductive porous substrate unwound by the unwinding machine; a second coating machine for applying a second microporous layer coating material to the electrically conductive porous substrate which is coated with the first microporous layer coating material and which is not substantially dried, the second coating machine being disposed on the same surface side as the substrate surface side on which the first coating machine is disposed; a dryer for drying the electrically conductive porous substrate coated with the first microporous layer coating material and the second microporous layer coating material; and a winding machine for winding the resulting gas diffusion electrode.

A fuel cell of the present invention includes the gas diffusion electrode of the present invention. That is, to both sides of an electrolyte membrane with a catalyst layer provided on both surfaces thereof, the gas diffusion electrode is press-bonded so as to come into contact with the catalyst layer, and members such as a bipolar plate are incorporated to construct a single cell. The resulting cell is used as a fuel cell. Here, the cell may be constructed in such a manner that a second microporous layer is in contact with the catalyst layer.

EXAMPLES

Hereinafter, the present invention will be described in detail by way of examples. The materials used in examples, the method for preparing an electrically conductive porous substrate, and the battery performance evaluation method for a fuel cell are described below.

<Materials>

A: Electrically Conductive Porous Substrate

A carbon paper having a thickness of 150 µm and a porosity of 85% was prepared in the following manner. Polyacrylonitrile-based carbon fiber "TORAYCA" (registered trademark) T300 (mean diameter of monofilaments: 7 µm) manufactured by Toray Industries, Inc. was cut at a length of 12 mm. Next, a papermaking process was carried out in which the carbon fiber was subjected to papermaking continuously with water as a papermaking medium, immersed in a 10 mass % polyvinyl alcohol aqueous solution, and dried. The carbon fiber was then wound up in a roll form to obtain a long carbon fiber paper having a carbon short fiber areal weight of 15 g/m$^2$. The loading amount of polyvinyl alcohol added was 20 parts by mass based on 100 parts by mass of the carbon fiber paper.

A dispersion liquid obtained by mixing scaly graphite (average particle diameter: 5 µm), phenol resin and methanol at a mass ratio of 5:10:85 was provided. A resin impregnation process was carried out in which the carbon fiber paper was continuously impregnated with the dispersion liquid in such a manner that the amount of a resin component (phenol resin+scaly graphite) was 130 parts by mass based on 100 parts by mass of carbon short fiber, and the carbon fiber paper was dried at a temperature of 100° C. for 5 minutes. The carbon fiber paper was then wound up in a roll form to obtain a resin-impregnated carbon fiber paper. As the phenol resin, one obtained by mixing a resol-type phenol resin and a novolac-type phenol resin at a mass ratio of 1:1 was used.

In a flat plate press, heat plates were set so as to be parallel to each other. A compression treatment was performed at a heat plate temperature of 180° C. for 5 minutes with a spacer disposed on a lower heat plate and a resin-impregnated carbon fiber paper.

A carbonization treatment was carried out in which as a precursor fiber sheet, the carbon fiber paper subjected to the compression treatment was introduced into a heating furnace kept in a nitrogen gas atmosphere, and was fired at a maximum temperature of 2400° C. The carbon fiber paper was then wound up in a roll form to obtain a carbon paper. The resulting carbon paper had a density of 0.25 g/cm$^3$ and a porosity of 85%.

B: Carbon Black 1 Contained in First Microporous Layer Coating Material

DBP oil absorption: 140 cc/100 g, BET specific surface area: 41 m$^2$/g, structure index: 3.4

Carbon Black 2 Contained in First Microporous Layer Coating Liquid

DBP oil absorption: 125 cc/100 g, BET specific surface area: 41 m$^2$/g, structure index: 3.1

C: Carbon Black 3 Contained in Second Microporous Layer Coating Liquid

DBP oil absorption: 175 cc/100 g, BET specific surface area: 67 m$^2$/g, structure index: 2.6

D: Hydrophobic Resin

"NEOFLON" (registered trademark) FEP Dispersion ND-110 (FEP resin manufactured by DAIKIN INDUSTRIES, Ltd.)

E: Surfactant

"TRITON" (registered trademark) X-100 (manufactured by Nacalai Tesque, Inc.)

<Measurement of Thickness of Substrate and Microporous Layer>

The thickness of the substrate (the gas diffusion electrode and the electrically conductive porous substrate) was measured using a digital thickness meter "DIGIMICRO" manufactured by Nikon Corporation. The thickness was measured while a load of 0.15 MPa was applied to the substrate.

The thickness of the microporous layer was measured by subtracting the thickness of the electrically conductive porous substrate from the thickness of the gas diffusion electrode when the coating thickness was examined in application of the microporous layer coating material to the substrate. That is, for the thickness of the first microporous layer, a difference between the thickness of the substrate coated with only the first microporous layer and the thickness of the electrically conductive porous substrate was defined as the thickness of the first microporous layer. At this time, the thickness of the microporous layer infiltrated into the electrically conductive porous substrate was not included. In addition, for the thickness of the second microporous layer, the thickness of the second microporous layer was adjusted by a level difference between a portion coated with the second microporous layer and a portion which was not coated with the second microporous layer in application of the second microporous layer on the electrically conductive porous substrate coated with the first microporous layer.

In addition, the thickness of the microporous layer in the gas diffusion electrode obtained by applying and sintering the microporous layer was measured using S-4800 manufactured by Hitachi, Ltd. as a scanning electron microscope. In a region of each of the electrically conductive porous substrate, the first microporous layer and the second microporous layer with respect to a cross-section perpendicular to the surface of the gas diffusion electrode, the distance between the interface between the electrically conductive porous substrate and the first microporous layer and the interface between the second microporous layer and the first microporous layer was defined as the thickness of the first microporous layer, and an average over ten visual fields was determined.

Further, the distance between the surface of the second microporous layer and the interface between the first microporous layer and the second microporous layer was defined as the thickness of the second microporous layer, and an average over ten visual fields was determined.

The distance between the surface of the second microporous layer and the interface between the electrically conductive porous substrate and the first microporous layer was divided into three equal parts, and the thus-obtained regions were defined as a first region, a second region and a third region from a side of the electrically conductive porous substrate.

An ion milling apparatus IM4000 manufactured by Hitachi High-Tech Solutions Corporation was used in preparation of the cross-section of the gas diffusion electrode. The magnification of the scanning electron microscope image in the measurement was 1000 times to 2000 times for the first microporous layer, and 2000 times to 3000 times for the second microporous layer.

<Measurement of Fluorine Intensity and Carbon Intensity>

Using an electron beam microanalyzer EPMA-1610 manufactured by Shimadzu Corporation, a characteristic X-ray reflected to an applied electron beam was detected, and the amount (% by mass) of fluorine or carbon was determined. The amount of fluorine or carbon (% by mass) was defined as the intensity of fluorine or carbon, and the fluorine intensity/carbon intensity ratio was determined by dividing the amount (% by mass) of fluorine by the amount (% by mass) of carbon.

For the fluorine intensity or the carbon intensity in each of the first region, the second region and the third region of the microporous layer, an average of amounts (% by mass) measured at intervals of 0.3 μm in the thickness direction of the microporous layer was calculated, and the resulting average was defined as the fluorine intensity or carbon intensity in each of the regions.

<Gas Diffusivity in Thickness Direction>

With a moisture vapor diffusion permeameter (MVDP-200C) manufactured by Seika Corporation, a gas for which diffusivity was to be measured is fed to one surface side (primary side) of the gas diffusion electrode, and a nitrogen gas was fed to the other surface side (secondary side) of the gas diffusion electrode. Control was performed so that a pressure difference between the primary side and the secondary side was in the vicinity 0 Pa (0±3 Pa) (i.e. the pressure difference hardly caused a gas flow, and only molecular diffusion caused a gas movement phenomenon), a gas concentration at the time of reaching equilibrium was measured by a gas concentration meter on the secondary side. This value (%) was defined as an index of gas diffusivity in the thickness direction.

<Gas Diffusivity in In-Plane Direction>

The moisture vapor diffusion permeameter (MVDP-200C) manufactured by Seika Corporation was used. In a system as shown in the FIGURE, first only a valve A (303) was opened, and a valve B (305) was kept closed, so that a nitrogen gas 313 was fed to a primary-side pipe A (302). The system was adjusted so that a predetermined amount (190 cc/minute) of a gas was fed to a mass flow controller (301), and a gas pressure of 5 kPa was applied to a pressure controller (304) with respect to atmospheric pressure. A gas diffusion electrode sample (308) was set on a seal material (312) present between a gas chamber A (307) and a gas chamber B (309). Then, the valve A (303) was closed, and the valve B (305) was opened, so that the nitrogen gas was fed to a pipe B (306). The nitrogen gas fed into the gas chamber A (307) moved to the gas chamber B (309) through voids of the gas diffusion electrode sample (308), passed through a pipe C (310), and further passed through a gas flow meter (311) to be released into the air. The gas flow rate (cc/minute) fed through the gas flow meter (311) at this time was measured, and the measured value was defined as gas diffusivity in an in-plane direction.

<Evaluation of Power Generation Performance>

The resulting gas diffusion electrode was disposed on both sides of an electrolyte membrane/catalyst integrated product (one obtained by forming a catalyst layer "PRIMEA" (registered trademark) manufactured by W. L. Gore & Associates, Inc. on both surfaces of an electrolyte membrane "GORE SELECT" (registered trademark) manufactured by W. L. Gore & Associates, Inc.) in such a manner that the catalyst layer and the microporous layer were in contact with each other, and hot pressing was performed to prepare a membrane electrode assembly (MEA). The membrane electrode assembly was incorporated into a single cell for a fuel cell, the cell temperature, the fuel utilization efficiency and the air utilization efficiency were set to 40° C., 70% and 40%, respectively, hydrogen on the anode side and air on the cathode side were humidified so as to have dew points of 75° C. and 60° C., respectively, and the cell was caused to generate power. The current density was increased, and the current density value at which power generation was stopped (limit current density) was defined as an index of flooding resistance. In addition, similar measurement was performed at a cell temperature of 90° C., and the measured value was defined as an index of dry-out resistance. Further, power generation performance under normal operation conditions (cell temperature: 70° C.) was measured.

Example 1

A carbon paper wound in a roll form and having a thickness of 150 μm and a porosity of 85% was subjected to a hydrophobic treatment by immersing the carbon paper in an immersion bath filled with a hydrophobic resin dispersion obtained by dispersing a fluororesin in water in a concentration of 2% by mass while the carbon paper was conveyed using a winding-type conveyance apparatus. The carbon paper was dried by a dryer set at 100° C., and was wound up by a winding machine to obtain an electrically conductive porous substrate subjected to a hydrophobic treatment. As the hydrophobic resin dispersion, one obtained by diluting FEP Dispersion ND-110 by water so as to attain a FEP concentration of 2% by mass was used.

Next, a winding-type continuous coater was provided in which a conveyance apparatus including an unwinding machine, a guide roll, a back roll, an inserting paper unwinding machine and a winding machine was equipped with two die coaters, a dryer and a sintering machine.

As an electrically conductive porous substrate subjected to the hydrophobic treatment, a web in which a carbon paper having a thickness of 150 μm, a porosity of 85% and a width of about 400 mm was wound in a length of 400 m in a roll form was set in the unwinding machine.

The web was conveyed by driving rolls installed in an unwinding section, a winding section and a coater section. First, a first microporous layer coating material was applied using the first die coater, and a second microporous layer coating material was then successively applied by the second die coater. In the dryer, moisture was removed by drying with hot air at 100° C. Further, the web was sintered in the sintering machine set at 350° C., and then wound up by the winding machine.

The microporous layer coating material was prepared in the following manner.

First Microporous Layer Coating Material:

15 parts by mass of carbon black 1, 5 parts by mass of a hydrophobic resin (FEP Dispersion ("NEOFLON" (registered trademark) ND-110), 15 parts by mass of a surfactant ("TRITON" (registered trademark) X-100) and 65 parts by mass of purified water were mixed and kneaded by a planetary mixer to prepare a coating material.

Second Microporous Layer Coating Material:

5 parts by mass of carbon black 3, 2 parts by mass of a hydrophobic resin (FEP Dispersion ("NEOFLON" (registered trademark) ND-110), 7 parts by mass of a surfactant ("TRITON" (registered trademark) X-100) and 86 parts by mass of purified water were mixed and kneaded by a planetary mixer to prepare a coating material.

In application of the first microporous layer coating material, adjustment was made so that the areal weight of the microporous layer after sintering was 16 g/m². Here, the first microporous layer had a thickness of 25 μm. Further, in application of the second microporous layer coating material, adjustment was made so that the second microporous layer had a thickness of 3 μm.

To both sides of an electrolyte membrane with a catalyst layer provided on both surfaces thereof, the gas diffusion electrode prepared as described above was thermally press-bonded in such a manner that the microporous layer and the catalyst layer were in contact with each other, and the resulting product was incorporated into a single cell for a fuel cell. Power generation performance (limit current density) was evaluated at each of temperatures of 40° C., 70° C. and 90° C.

The results are shown in Tables 1 and 2 including physical property values.

Example 2

A gas diffusion electrode was prepared in the same manner as in Example 1 except that in Example 1, the carbon black in the first microporous layer coating material was changed to carbon black 2.

Example 3

A gas diffusion electrode was prepared in the same manner as in Example 1 except that in Example 1, the content of the hydrophobic resin in the second microporous layer coating material was changed to 1.9 parts by mass.

Example 4

A gas diffusion electrode was prepared in the same manner as in Example 3 except that in Example 3, the carbon black in the first microporous layer coating material was changed to carbon black 2.

Example 5

A gas diffusion electrode was prepared in the same manner as in Example 1 except that in Example 1, the content of the hydrophobic resin in the second microporous layer coating material was changed to 2.5 parts by mass.

Example 6

A gas diffusion electrode was prepared in the same manner as in Example 5 except that in Example 5, the carbon black in the first microporous layer coating material was changed to carbon black 2.

Example 7

A gas diffusion electrode was prepared in the same manner as in Example 1 except that in Example 1, the content of the hydrophobic resin in the second microporous layer coating material was changed to 2.8 parts by mass.

Example 8

A gas diffusion electrode was prepared in the same manner as in Example 7 except that in Example 7, the carbon black in the first microporous layer coating material was changed to carbon black 2.

Example 9

A gas diffusion electrode was prepared in the same manner as in Example 1 except that in Example 1, the content of the hydrophobic resin in the second microporous layer coating material was changed to 3 parts by mass.

Example 10

A gas diffusion electrode was prepared in the same manner as in Example 9 except that in Example 9, the carbon black in the first microporous layer coating material was changed to carbon black 2.

Comparative Example 1

A gas diffusion electrode was prepared in the same manner as in Example 1 except that in Example 1, the second microporous layer was not formed, and only one layer was formed as the microporous layer.

Comparative Example 2

A gas diffusion electrode was prepared in the same manner as in Comparative Example 1 except that in Comparative Example 1, the carbon black in the first microporous layer coating material was changed to carbon black 2.

Comparative Example 3

A gas diffusion electrode was prepared in the same manner as in Example 1 except that in Example 1, the content of the hydrophobic resin in the second microporous layer coating material was changed to 5 parts by mass.

Comparative Example 4

A gas diffusion electrode was prepared in the same manner as in Comparative Example 3 except that in Comparative Example 3, the carbon black in the first microporous layer coating material was changed to carbon black 2.

TABLE 1

|  |  | Unit | Example 1 | Example 2 | Example 3 | Example 4 | Example 5 | Example 6 | Example 7 |
|---|---|---|---|---|---|---|---|---|---|
| First microporous layer | Content of hydrophobic resin | parts by mass | 5 | 5 | 5 | 5 | 5 | 5 | 5 |
| Second microporous layer | Content of hydrophobic resin | parts by mass | 2 | 2 | 1.9 | 1.9 | 2.5 | 2.5 | 2.8 |
| First region | Fluorine intensity | % by mass | 9.0 | 9.0 | 9.0 | 9.0 | 9.0 | 9.0 | 9.0 |
|  | Carbon intensity | % by mass | 96 | 96 | 96 | 96 | 96 | 96 | 96 |
| Second region | Fluorine intensity | % by mass | 9.0 | 9.0 | 9.0 | 9.0 | 9.0 | 9.0 | 9.0 |
|  | Carbon intensity | % by mass | 96 | 96 | 96 | 96 | 96 | 96 | 96 |
| Third region | Fluorine intensity | % by mass | 9.0 | 9.0 | 8.8 | 8.8 | 10.0 | 10.0 | 10.3 |
|  | Carbon intensity | % by mass | 92 | 92 | 91 | 91 | 90 | 90 | 89 |
| Fluorine intensity of third region/fluorine intensity of second region | | — | 1.00 | 1.00 | 0.98 | 0.98 | 1.11 | 1.11 | 1.14 |
| Fluorine intensity of third region/fluorine intensity of first region | | — | 1.00 | 1.00 | 0.98 | 0.98 | 1.11 | 1.11 | 1.14 |
| Ratio of fluorine intensity to carbon intensity in third region/ratio of fluorine intensity to carbon intensity in second region | | — | 1.04 | 1.04 | 1.03 | 1.03 | 1.19 | 1.19 | 1.23 |
| Ratio of fluorine intensity to carbon intensity in third region/ratio of fluorine intensity to carbon intensity in first region | | — | 1.04 | 1.04 | 1.03 | 1.03 | 1.19 | 1.19 | 1.23 |
| Gas diffusion electrode | Gas diffusivity in thickness direction | % | 32 | 32 | 32 | 32 | 29 | 29 | 29 |
|  | Gas diffusivity in in-plane direction | cc/minute | 102 | 101 | 103 | 104 | 89 | 88 | 86 |
|  | Power generation Performance (@40° C.) | A/cm$^2$ | 1.74 | 1.72 | 1.77 | 1.78 | 1.64 | 1.63 | 1.62 |
|  | Power generation Performance (@70° C.) | A/cm$^2$ | 2.48 | 2.50 | 2.42 | 2.40 | 2.31 | 2.35 | 2.29 |
|  | Power generation Performance (@90° C.) | A/cm$^2$ | 1.67 | 1.67 | 1.69 | 1.67 | 1.52 | 1.54 | 1.49 |

TABLE 2

|  |  | Unit | Example 8 | Example 9 | Example 10 | Comparative Example 1 | Comparative Example 2 | Comparative Example 3 | Comparative Example 4 |
|---|---|---|---|---|---|---|---|---|---|
| First microporous | Content of hydrophobic resin | parts by mass | 5 | 5 | 5 | 5 | 5 | 5 | 5 |

TABLE 2-continued

| | | Unit | Example 8 | Example 9 | Example 10 | Comparative Example 1 | Comparative Example 2 | Comparative Example 3 | Comparative Example 4 |
|---|---|---|---|---|---|---|---|---|---|
| layer | | | | | | | | | |
| Second microporous layer | Content of hydrophobic resin | parts by mass | 2.8 | 3 | 3 | None | None | 5 | 5 |
| First region | Fluorine intensity | % by mass | 9.0 | 9.0 | 9.0 | 12 | 12 | 9.0 | 9.0 |
| | Carbon intensity | % by mass | 96 | 96 | 96 | 96 | 96 | 94 | 94 |
| Second region | Fluorine intensity | % by mass | 9.0 | 9.0 | 9.0 | 8.0 | 8.0 | 9.0 | 9.0 |
| | Carbon intensity | % by mass | 96 | 96 | 96 | 96 | 96 | 94 | 94 |
| Third region | Fluorine intensity | % by mass | 10.3 | 10.8 | 10.8 | 5.0 | 5.0 | 12 | 12 |
| | Carbon intensity | % by mass | 89 | 88 | 88 | 97 | 97 | 94 | 94 |
| Fluorine intensty of third region/fluorine intensity of second region | | — | | 1.14 | 1.20 | 1.20 | 0.63 | 0.63 | 1.33 | 1.33 |
| Fluorine intensity of third region/fluorine intensity of first region | | — | | 1.14 | 1.20 | 1.20 | 0.42 | 0.42 | 1.33 | 1.33 |
| Ratio of fluorine intensity to carbon intensity in third region/ratio of fluorine intensity to carbon intensity in second region | | — | | 1.23 | 1.31 | 1.31 | 0.62 | 0.62 | 1.33 | 1.33 |
| Ratio of fluorine intensity to carbon intensity in third region/ratio of fluorine intensity to carbon intensity in first region | | — | | 1.23 | 1.31 | 1.31 | 0.41 | 0.41 | 1.33 | 1.33 |
| Gas diffusion electrode | Gas diffusivity in thickness direction | % | 29 | 29 | 29 | 29 | 29 | 32 | 32 |
| | Gas diffusivity in in-plane direction | cc/minute | 87 | 89 | 90 | 85 | 84 | 55 | 56 |
| | Power generation Performance (@40° C.) | A/cm$^2$ | 1.60 | 1.58 | 1.59 | 1.10 | 1.09 | 1.25 | 1.26 |
| | Power generation Performance (@70° C.) | A/cm$^2$ | 2.27 | 2.19 | 2.18 | 2.19 | 2.20 | 2.17 | 2.19 |
| | Power generation Performance (@90° C.) | A/cm$^2$ | 1.47 | 1.44 | 1.43 | 1.41 | 1.43 | 1.39 | 1.38 |

DESCRIPTION OF REFERENCE SIGNS

301: Mass flow controller
302: Primary-side pipe A
303: Valve A
304: Pressure controller
305: Valve B
306: Pipe B
307: Gas chamber A
308: Gas diffusion electrode sample
309: Gas chamber B
310: Pipe C
311: Gas flow meter
312: Seal material
313: Nitrogen gas

The invention claimed is:

1. A gas diffusion electrode comprising a microporous layer on at least one surface of an electrically conductive porous substrate, wherein
provided that regions obtained by dividing a cross-section perpendicular to the surface of the microporous layer into three equal parts in a thickness direction are a first region, a second region and a third region from a side of the electrically conductive porous substrate, the fluorine intensity of the third region is 0.8 to 1.2 times the fluorine intensity of the second region,
wherein the microporous layer contains a fluororesin and electrically conductive fine particles,
wherein the microporous layer has a two-layer structure such that a first microporous layer is on the electrically conductive porous substrate side and a second microporous layer is on the surface side of the microporous layer, and
wherein the content of the fluororesin in a second microporous layer coating material of the second microporous layer is smaller than the content of the fluororesin in a first microporous layer coating material of the first microporous layer,
wherein the microporous layer contains carbon black, the carbon black in the third region has a structure index of less than 3.0, and the carbon black in the first region has a structure index of 3.0 or more.

2. A gas diffusion electrode comprising a microporous layer on at least one surface of an electrically conductive porous substrate, wherein
provided that regions obtained by dividing a cross-section perpendicular to the surface of the microporous layer into three equal parts in a thickness direction are a first region, a second region and a third region from a side of the electrically conductive porous substrate, the fluorine intensity of the third region is 0.8 to 1.2 times the fluorine intensity of the first region,
wherein the microporous layer contains carbon black, the carbon black in the third region has a structure index of less than 3.0, and the carbon black in the first region has a structure index of 3.0 or more.

3. The gas diffusion electrode according to claim 1, wherein the fluorine intensity of the third region is 0.8 to 0.98 times the fluorine intensity of the second region.

4. The gas diffusion electrode according to claim 1, wherein the fluorine intensity of the third region is 0.8 to 1.0 times the fluorine intensity of the first region.

5. The gas diffusion electrode according to claim 1, wherein the fluorine intensity of the third region is 0.8 to 1.0 times the fluorine intensity of the second region, and 0.8 to 1.0 times the fluorine intensity of the first region.

6. The gas diffusion electrode according to claim 1, wherein the fluorine intensity/carbon intensity ratio of the third region is 1.0 to 1.3 times the fluorine intensity/carbon intensity ratio of the second region where the fluorine intensity/carbon intensity ratio is a ratio of the fluorine intensity to the carbon intensity (fluorine intensity/carbon intensity).

7. The gas diffusion electrode according to claim 1, wherein the fluorine intensity/carbon intensity ratio of the third region is 1.0 to 1.3 times the fluorine intensity/carbon intensity ratio of the first region where the fluorine intensity/carbon intensity ratio is a ratio of the fluorine intensity to the carbon intensity (fluorine intensity/carbon intensity).

8. A fuel cell comprising the gas diffusion electrode according to claim 1.

* * * * *